United States Patent

Guerrero

[11] Patent Number: 5,980,069
[45] Date of Patent: Nov. 9, 1999

[54] BEACON LIGHT DEFLECTOR

[76] Inventor: Ramiro Guerrero, 3490 Belcourt, Longueuil, Quebec, Canada, J4M 2K9

[21] Appl. No.: 08/997,750

[22] Filed: Dec. 24, 1997

[30] Foreign Application Priority Data

Feb. 11, 1997 [CA] Canada .................................... 2197271

[51] Int. Cl.⁶ ..................................................... F21V 1/12
[52] U.S. Cl. ......................... 362/360; 362/249; 362/291; 362/354; 362/431; 362/452
[58] Field of Search ................................ 362/153, 153.1, 362/248, 290, 291, 354, 360, 450, 452, 470, 249, 431

[56] References Cited

U.S. PATENT DOCUMENTS

| 1,396,936 | 11/1921 | Locke | 362/290 |
| 3,593,014 | 7/1971 | Vesely | 362/360 |
| 3,634,675 | 1/1972 | Alamo et al. | 362/153.1 |
| 4,293,898 | 10/1981 | Budnovitch et al. | 362/291 |
| 4,814,961 | 3/1989 | O'Brien et al. | 362/354 |
| 4,999,749 | 3/1991 | Dormand | 362/153.1 |
| 5,068,773 | 11/1991 | Toth | 362/153.1 |

*Primary Examiner*—Alan Cariaso
*Attorney, Agent, or Firm*—Eric Fincham

[57] ABSTRACT

A beacon light assembly shield for shield from ground level the light emitted by tower mounted beacon lights for aircraft, the assembly comprising a plurality of spaced concentric frustraconically shaped elements having a centrally located aperture, the element being interconnected, and each element being spaced from an adjacent element such that a distance between a first horizontal plane coincidental with an inner peripheral edge and a second horizontal plane coincidental with an outer peripheral edge is no greater than 75% of a distance between first horizontal planes of adjacent elements. The assembly effectively eliminates light pollution from ground level while permitting visual access for aircraft.

9 Claims, 3 Drawing Sheets

BEACON LIGHT DEFLECTOR

BACKGROUND OF THE INVENTION

The present invention relates to beacon light deflectors.

Beacon lights are required on structures above a certain height in localities where aircraft are present. These requirements are usually covered by federal regulation and require at least one beacon on top of a structure and often a plurality of beacons at designated heights. Particularly affected by this requirement are towers such as may be used by power utilities and cellular phone transmitters.

Of increasing concern is the problem of light pollution and this becomes more problematic as the number of towers increases in residential areas. Thus, the beacons are required to give off a certain light intensity which can be a problem aesthetically in many localities.

While this problem has existed for some time, to the best of applicant's knowledge there have not been any commercially acceptable devices which overcome the problem. Thus, while one can shield the light from the ground, in doing so one must also provide visual access for the aircraft for which the light is intended. Furthermore, the problem of nesting birds in any structure and ice and snow must also be taken into account. Still further, access must be had to the beacon itself for changing the bulbs. One must also ensure that the structure is sufficiently light to mount on a tower while also having the properties of the strength to resist wind and also ice build up. One must also be certain that noises are not created as a function of the wind.

A further problem associated with beacon lights is vandalism. Frequently these targets are shot at either for reasons of eliminating the light nuisance or they may merely serve as a target for vandalism.

SUMMARY OF THE INVENTION

It is an object of the present invention to provide an assembly for mounting about a beacon light to minimize the amount of light seen at ground level while still providing ready visual access for aircraft.

According to one aspect of the present invention, there is provided a beacon light shield assembly comprising: a plurality of spaced apart concentric frustraconically shaped elements, each element having a centrally located aperture, each element having an outer peripheral edge and an inner peripheral edge surrounding the centrally located aperture, means interconnecting the elements, each element being spaced apart from an adjacent element such that a distance between a first horizontal plane coincidental with the inner peripheral edge and a second horizontal plane coincidental with the outer peripheral edge is no greater than 75% of a distance between first horizontal planes of adjacent elements.

According to a further aspect of the present invention, in a tower having a light beacon thereon, there is provided an improvement comprising a beacon light shield assembly, the improvement comprising a beacon light shield assembly mounted about the light beacon, the beacon light shield assembly comprising a plurality of spaced apart concentric frustraconically shaped elements, each element having a centrally located aperture, each element having an outer peripheral edge and an inner peripheral edge surrounding the centrally located aperture, means interconnecting the elements, each element being spaced apart from an adjacent element such that a distance between a first horizontal plane coincidental with the inner peripheral edge and a second horizontal plane coincidental with the outer peripheral edge is no greater than 75% of a distance between first horizontal planes of adjacent elements, the inner peripheral edges of each of the elements of the beacon light shield assemblies being spaced from the beacon light.

In greater detail, the beacon light shield assembly of the present invention is designed to minimize light pollution at ground level while still providing warning access to aircraft.

The slope or angle of the frustraconically shaped elements may vary depending upon the particular situation. Factors which must be taken into account include the height of the beacon on the tower and the specific geographic terrain. Similarly, the sizing of the elements is also a factor co-dependent on the angles selected. Generally, the slope would be between 5° and 12°.

Even with a single tower installation, wherein at least one beacon is provided for every 100 vertical rise, the angles may vary depending upon the placement of the beacon. Thus, the angle of the elements of an upper shield may be less than those installed at a lower elevation.

The elements are preferably treated to provide the desired properties. To this end, the top surface should be smooth to enhance drainage and particularly to prevent the build up of a ice and snow thereon. The bottom surface is preferably non reflective and to this end, a suitable non reflective paint may be applied thereto. The surface would also tend to be somewhat rougher.

As previously mentioned, access to the light bulbs in the beacon itself is important. For security purposes, the bulbs are often routinely changed at a certain interval e.g. on an annual basis. The housing of the beacon light typically is hinged to provide access to the bulbs.

In the preferred embodiment of the present invention, the means interconnecting the elements together have an upper portion and a lower portion, which are releasably secured together. In so doing, the upper portion may easily be removed to provide access to the beacon light bulb by the worker.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
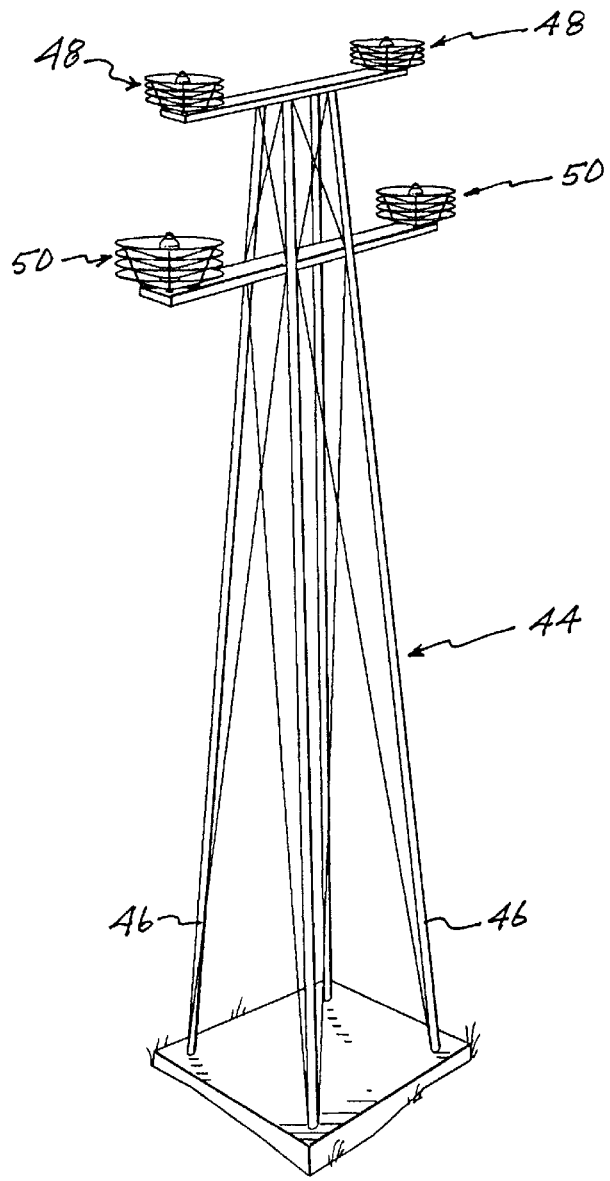
FIG. 1 is a perspective view of a tower having beacon lights and beacon light shield assemblies thereon.
Figure 2:
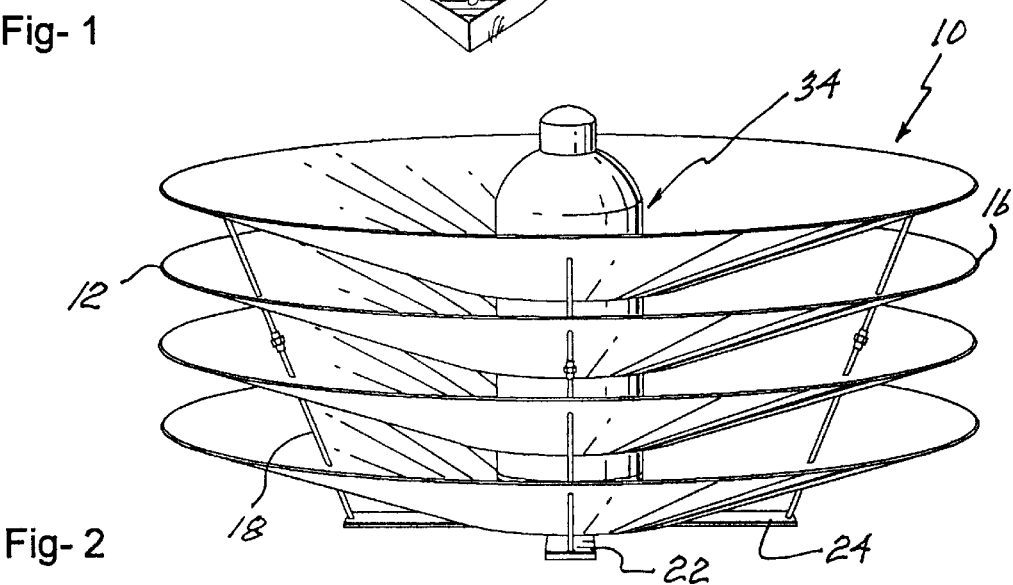
FIG. 2 is a perspective view of an embodiment of a beacon light shield assembly according to one embodiment of the present invention.
Figure 3:
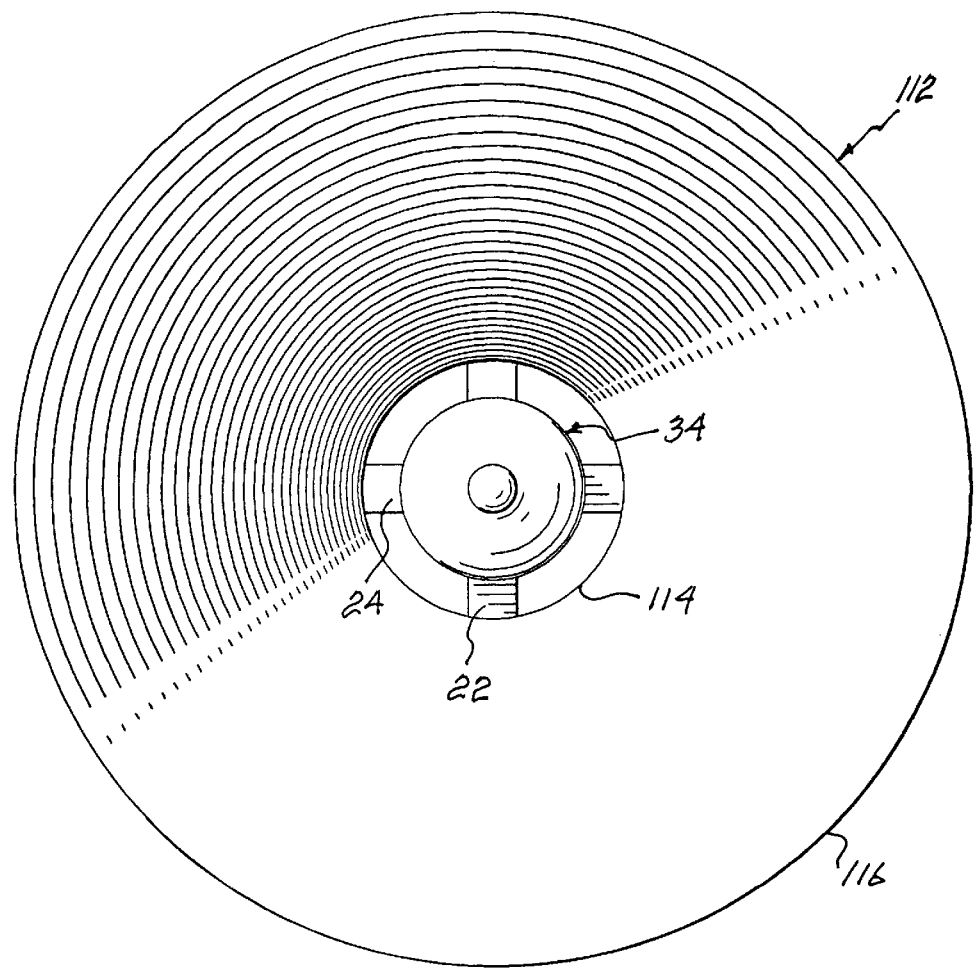
FIG. 3 is a top plan view of the beacon light shield assembly and beacon light of FIG. 2.
Figure 4:
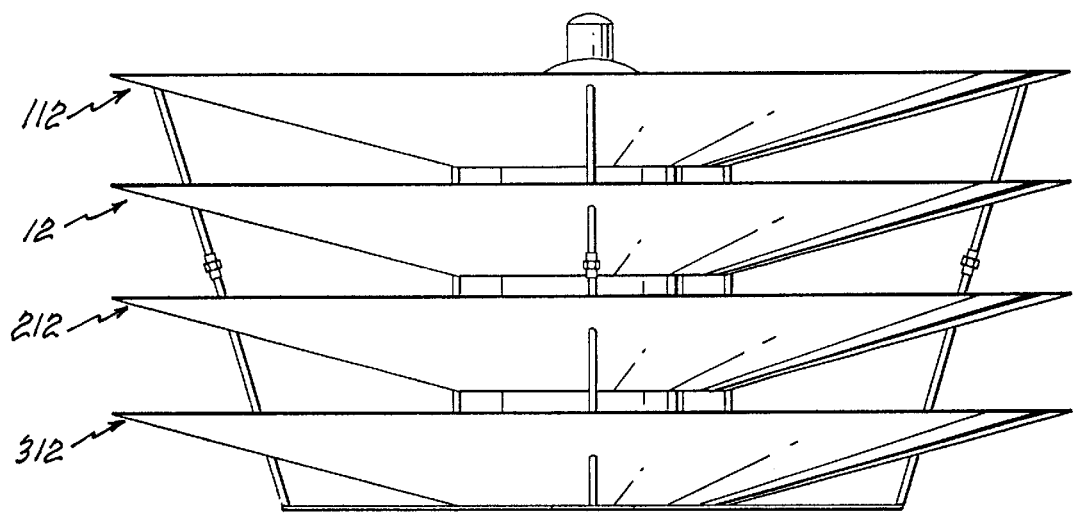
FIG. 4 is a side elevational view thereof.

Referring to the drawings in greater detail and by reference characters thereto, a typical beacon light shield assembly of the present invention is generally designated by reference numeral 10 and initially reference will be had to FIGS. 2 to 5 illustrating an embodiment thereof.

Beacon light shield assembly 10 includes a plurality of frustraconically shaped elements, of which four (4) such elements are shown in the illustrated embodiment and are designated by reference numerals 12, 112, 212 and 312. As the elements are all substantially identical, only one will be described in detail herein.

Frustraconically shaped element 12 has an outer peripheral edge 16 and an inner aperture which is defined by an inner peripheral edge 14.

At its lower extremity, beacon light shield assembly 10 has a base formed of a first structural base member 22 and a second structural base member 24 which are substantially perpendicular to each other.

Extending upwardly from base members 22 and 24 are a plurality of outer structural interconnecting members 18, with four such members being shown in the drawings and being spaced apart by 90°. Each of outer structural interconnecting members 18 may be secured to base members 22, 24 and each of frustraconically shaped elements 12, 112, 212 and 312 by suitable means including, for example, welding.

The are also provided four (4) inner structural interconnecting members 20 which also extend between base members 22, 24 and frustraconically shaped elements 12, 112, 212 and 312 and are similarly secured thereto.

Each of outer structural interconnecting members 18 and inner structural interconnecting members 20 have an upper portion and a lower portion which are connected together by a screw threaded connector 26. In so doing, there is thus provided an upper beacon light shield portion generally designated by reference numeral 28 and a lower beacon light shield portion generally designated by reference 30. (See FIG. 6)

As may be seen in the drawings, each of frustraconically shaped elements 12, 112, 212 and 312 are spaced from each other. The spacing is important to the invention and as shown, there is a first horizontal plane 32 which is coincidental with the inner peripheral edge and a second horizontal plane 33 which is coincidental with the outer peripheral edge. The arrangement is such that the distance between first horizontal plane 32 and second horizontal plane 33 is no greater than 75% of the distance adjacent first horizontal planes and/or adjacent second horizontal planes 33.

Figure 5:
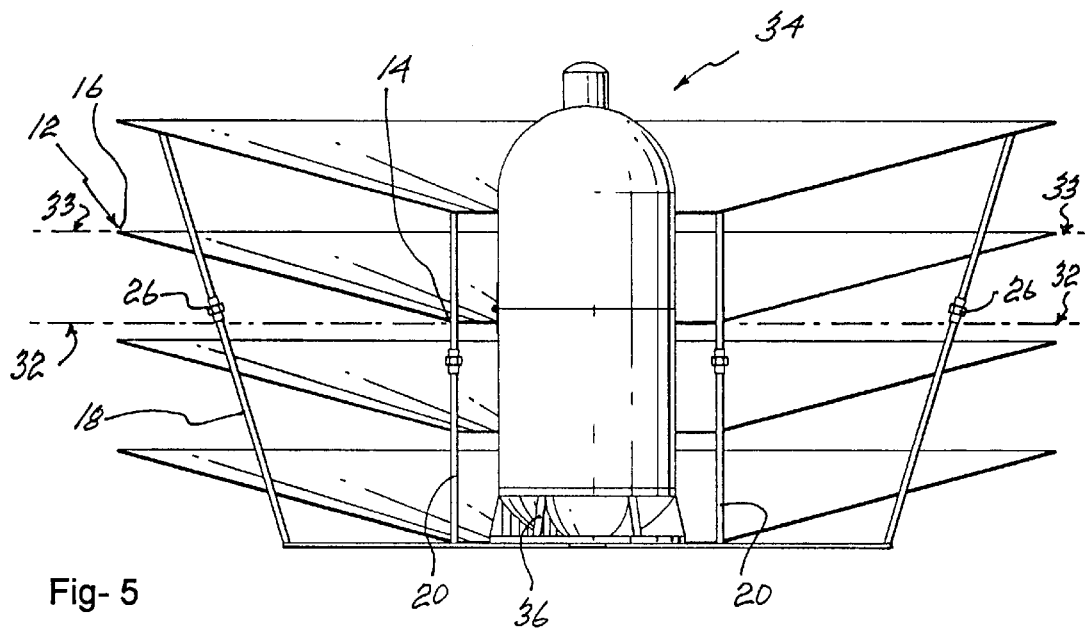
FIG. 5 is a cross sectional view thereof.

The beacon light shield assembly 10 is designed to be mounted about a beacon light assembly generally designated by reference numeral 34. Beacon light assembly 34 includes a conventional base portion 36 and an outer casing 38. As is best seen in FIGS. 5 and 6, the outer casing 38 of beacon light assembly 74 has an upper portion which is hingedly attached as indicated at 40.

The beacon light shield assembly 10 of the present invention is designed to be placed about a beacon light assembly 34 with base members 22 and 24 being suitably secured (not shown).

Beacon light shield assembly 10 is designed to be mounted on a tower generally designated by reference numeral 44 and which tower 44 has structural members 46. As schematically illustrated in FIG. 1, there may be provided a plurality of upper light shield assemblies 48 and a plurality of lower light shield assemblies 50. In this embodiment, the angle of inclination of the elements of upper light shield assembly 48 may be different (lower) than the angle of inclination of the elements of lower light shield assemblies 50.

Figure 6:
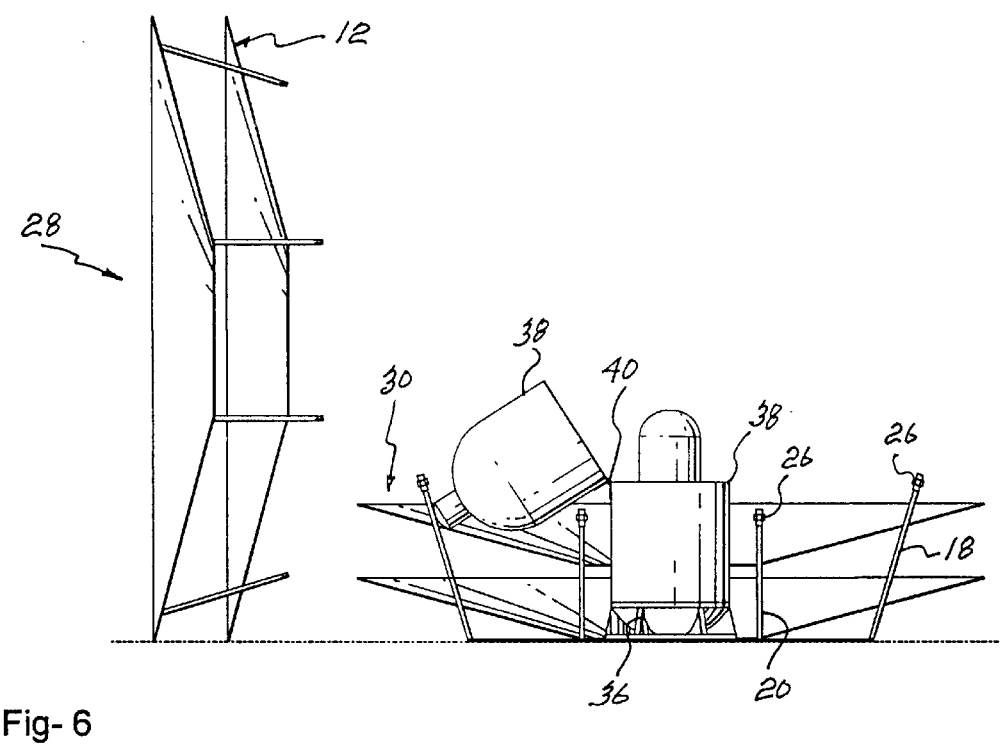
FIG. 6 is a side elevational view illustrating removal of an upper portion of the beacon light shield assembly of the present invention.

For maintenance purposes, and as may be best seen in FIG. 6, upper shield portion 28 may be disconnected from lower shield portion 30 by means of screw threaded connectors 26. The worker then has access to the interior of beacon light assembly 34.

It will be understood that the above described embodiments are for purposes of illustration only and that changes and modifications may be made thereto without departing from the spirit and scope of the invention.

I claim:

1. A beacon light shield assembly comprising:

a. a plurality of spaced apart concentric frustraconically shaped elements, each element having a centrally located aperture, each element having an outer peripheral edge and an inner peripheral edge surrounding said centrally located aperture, b. means interconnecting said elements;

c. each element being spaced apart from an adjacent element such that a distance between a first horizontal plane coincidental with said inner peripheral edge and a second horizontal plane coincidental with said outer peripheral edge is no greater than 75% of a distance between first horizontal planes of adjacent elements.

2. The beacon light shield assembly of claim 1 wherein a bottom surface of each of said elements has non light reflective properties.

3. The beacon light shield assembly of claim 2 wherein an upper surface of each of said elements has a smooth surface to facilitate drainage thereof.

4. The beacon light shield assembly of claim 1 further including a base, said means interconnecting said elements comprising a plurality of inner structural member and a plurality of outer structural members, each of said structural members extending between and being secured to said base and each of said elements.

5. The beacon light shield assembly of claim 4 wherein each of said structural members has a structural member upper portion and a structural member lower portion, said structural member upper portion and said structural member lower portion of each of said structural members being releasably secured together whereby an upper portion of said light shield assembly may be removed from a lower portion of said light shield assembly.

6. The beacon light shield assembly of claim 5 including four of said inner structural members and four of said outer structural members.

7. The beacon light shield assembly of claim 3 wherein said elements are formed of a stainless steel, said lower surface of each of said elements having a non reflective paint coating thereon.

8. In a tower having a light beacon thereon, the improvement comprising a beacon light shield assembly mounted about said light beacon, said beacon light shield assembly comprising a plurality of spaced apart concentric frustraconically shaped elements, each element having a centrally located aperture, each element having an outer peripheral edge and an inner peripheral edge surrounding said centrally located aperture, means interconnecting said elements, each element being spaced apart from an adjacent element such that a distance between a first horizontal plane coincidental with said inner peripheral edge and a second horizontal plane coincidental with said outer peripheral edge is no greater than 75% of a distance between first horizontal planes of adjacent elements, said inner peripheral edges of each of said elements of said beacon light shield assemblies being spaced from said beacon light.

9. In a tower of claim 8 wherein said tower has a plurality of vertically spaced light beacons thereon, the improvement wherein each of said light beacons has one of said light beacon shield assemblies associated therewith, upper ones of said light beacon shield assemblies having a distance between said first horizontal plane and said second horizontal plane less than distances between said first horizontal plane and said second horizontal plane of lower light beacon shield assemblies.

\* \* \* \* \*